(12) United States Patent
Owa (10) Patent No.: US 10,070,483 B2
(45) Date of Patent: Sep. 4, 2018

(54) HEATING CONTROL DEVICE AND HEATING CONTROL METHOD

(71) Applicant: SHIMADZU CORPORATION, Kyoto-shi, Kyoto (JP)

(72) Inventor: Michiaki Owa, Kyoto (JP)

(73) Assignee: SHIMADZU CORPORATION, Kyoto-shi, Kyoto (JP)

( * ) Notice: Subject to any disclaimer, the term of this patent is extended or adjusted under 35 U.S.C. 154(b) by 484 days.

(21) Appl. No.: 14/732,916

(22) Filed: Jun. 8, 2015

(65) Prior Publication Data

US 2016/0357200 A1   Dec. 8, 2016

(51) Int. Cl.
*F22B 1/20* (2006.01)
*H05B 1/02* (2006.01)
*G05D 23/19* (2006.01)

(52) U.S. Cl.
CPC ....... *H05B 1/0247* (2013.01); *G05D 23/1919* (2013.01)

(58) Field of Classification Search
None
See application file for complete search history.

(56) References Cited

U.S. PATENT DOCUMENTS

| | | | | |
|---|---|---|---|---|
| 4,094,269 A * | 6/1978 | Malinovski | ........... | C23C 14/243 118/725 |
| 6,473,563 B2 * | 10/2002 | Takamatsu | .......... | C23C 16/4404 392/388 |
| 6,718,126 B2 * | 4/2004 | Lei | ....... | C23C 16/4481 392/388 |
| 7,186,385 B2 * | 3/2007 | Ganguli | ................. | C23C 16/18 392/386 |
| 7,489,857 B2 * | 2/2009 | Takamatsu | .............. | C01B 13/20 118/712 |
| 7,569,191 B2 * | 8/2009 | Ganguli | ................. | C23C 16/18 392/386 |
| 7,699,023 B2 * | 4/2010 | Chen | ....................... | C23C 16/34 118/715 |

(Continued)

FOREIGN PATENT DOCUMENTS

JP   2-122260 A   5/1990
JP   2003-149217 A   5/2003

(Continued)

*Primary Examiner* — Thor Campbell
(74) *Attorney, Agent, or Firm* — Sughrue Mion, PLLC (57) ABSTRACT

When a solid product of a target component is obtained by heating a container in which a solution containing a target component is housed with a heater and evaporating the solvent in the solution, the amount of heating by the heater is controlled based on the detection results of the temperature of the container detected by a temperature detection part so that the temperature of the container approaches a target temperature. At least one of a starting timing T2 and an ending timing T4 is then discriminated based on the amount of heating by the heater. Since the amount of heating by the heater varies while being sensitively affected by the vaporization heat generated when the solvent evaporates, the starting timing T2 or the ending timing T4 can be accurately discriminated by using the amount of heating by the heater as a discrimination criterion.

5 Claims, 6 Drawing Sheets

(56) References Cited

U.S. PATENT DOCUMENTS

| | | | | |
|---|---|---|---|---|
| 7,699,295 B2* | 4/2010 | Lee | ................ | C23C 16/4482 |
| | | | | 261/121.1 |
| 8,952,186 B2* | 2/2015 | Kindler | ................ | C07D 307/46 |
| | | | | 549/488 |
| 8,968,563 B2* | 3/2015 | Iwata | ................ | B01D 15/24 |
| | | | | 159/4.01 |
| 2004/0083965 A1* | 5/2004 | Wang | ................ | B01D 3/346 |
| | | | | 118/715 |
| 2004/0170403 A1* | 9/2004 | Lei | ................ | C23C 16/4481 |
| | | | | 392/388 |

FOREIGN PATENT DOCUMENTS

| | | |
|---|---|---|
| JP | 2009-180618 A | 8/2009 |
| WO | 2009/044428 A1 | 4/2009 |

* cited by examiner

HEATING CONTROL DEVICE AND HEATING CONTROL METHOD

TECHNICAL FIELD

The present invention relates to a heating control device, a heating control method, and a program for a heating control device for obtaining a solid product of a target component by heating a container in which a solution containing the target component is housed with a heater and evaporating the solvent in the solution.

BACKGROUND ART

In the field of pharmaceutical manufacturing, for example, a fractionation and purification device using a liquid chromatograph is sometimes used to analyze a compound obtained by chemical synthesis in detail or to store a compound as a compound library. Examples of fractionation and purification devices using such a liquid chromatograph are illustrated in Patent Documents 1 and 2 below.

In a fractionation and purification device of this type, a target component (compound) contained in a sample, for example, is isolated using a liquid chromatograph and is introduced into a trap column as an eluate. As a result, the target component contained in the eluate is captured by the trap column. A solvent is then introduced into the trap column so that the target component in the trap column is once again eluted, and the solution containing the target component is fractionated. The fractionated solution is collected in a container and, as illustrated in Patent Document 3 below, heated with a heater, for example, so that the solvent in the solution is evaporated and a solid product of the target component is obtained.

One possible method of heating the solution containing the target component with a heater is a method of, for example, setting the driving time of the heater and driving the heater until the driving time has elapsed. However, an appropriate driving time of the heater varies depending on the type of the solvent or the target component, so there is a risk that it may not be possible to satisfactorily evaporate the solvent with a method such as that described above.

That is, when the driving time of the heater is shorter than an appropriate driving time, there is a risk that the solvent will not be completely evaporated and that it will not be possible to obtain the target component as a solid product. On the other hand, when the driving time of the heater is longer than an appropriate driving time, the target component is heated longer than is necessary even after the solvent has been completely evaporated, which leads to the risk that the target component may be transformed by oxidation or decomposition.

Therefore, as illustrated in Patent Document 4 described below, one possible method is to stop heating with a heater based on the rate of change in temperature of the container. In Patent Document 4, the temperature of a rack holding a container is detected so that the temperature of the container is indirectly detected. More specifically, the driving of the heater is controlled so that the temperature of the rack is kept constant, and heating with a heater is stopped based on the rate of change in the temperature of the rack when the solvent evaporates and vaporization heat is no longer generated (paragraphs [0017], [0026], and the like).

PRIOR ART DOCUMENTS

Patent Documents

[PATENT DOCUMENT 1] Japanese Unexamined Patent Application Publication H2-122260
[PATENT DOCUMENT 2] Japanese Unexamined Patent Application Publication 2003-149217
[PATENT DOCUMENT 3] WIPO 2009/044428
[PATENT DOCUMENT 4] Japanese Unexamined Patent Application Publication 2009-180618

SUMMARY OF THE INVENTION

Problem to be Solved by the Invention

Figure 6:
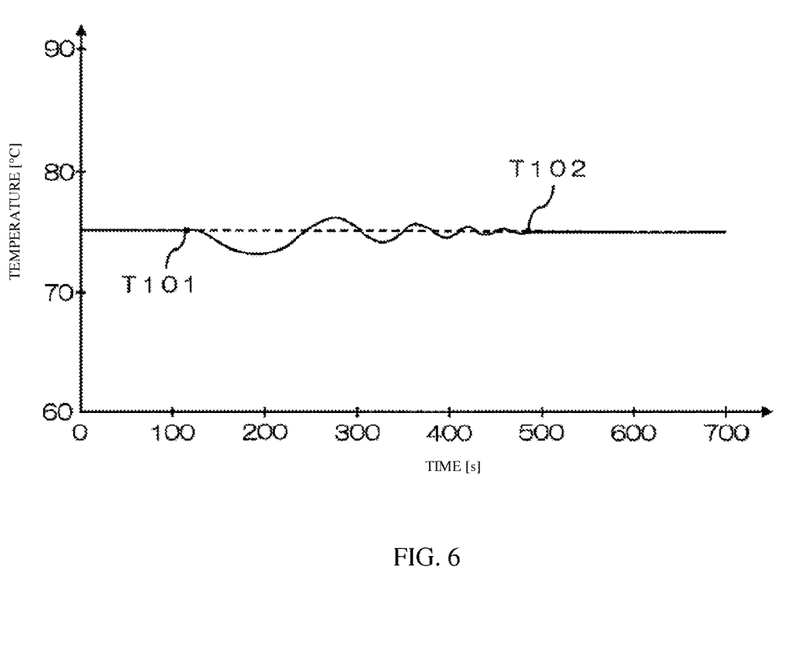
FIG. 6 illustrates an example of changes in the temperature of a container when a solution containing a target component is heated by a heater.

FIG. 6 illustrates an example of changes in the temperature of a container when a solution containing a target component is heated with a heater. As illustrated in FIG. 6, no vaporization heat is generated before timing T101 at which the solution containing the target component is housed inside the container, so the temperature of the container is stabilized and kept constant.

When the solution containing the target component is housed inside the container from this steady state (timing T101), the temperature of the container temporarily drops. The driving of the heater is then controlled so that the temperature of the container is kept constant, but the temperature of the container varies between a temperature that is higher than the steady state and a temperature that is lower than the steady state for a while, so the temperature is not stabilized, and the gradually stabilizes as time passes. When the solvent is then evaporated and vaporization heat is no longer generated (timing T102), the temperature of the container has roughly returned to the steady state, so heating with the heater is stopped based on the rate of change in the temperature of the container at that time.

However, when a small amount of a solution is housed inside the container from a state in which the container is constantly held at a relatively high temperature the change in the temperature of the container is very small, so it is difficult to accurately measure the rate of change in temperature. Therefore, it is difficult to discriminate the starting timing at which the solidification of the target component begins, the ending timing at which the solidification of the target component ends, and the like based on the rate of change in temperature. In particular, for the ending timing, the rate of change in temperature must be measured in a state in which the change in the temperature of the container is very small, so it is even more difficult to accurately measure the rate of change in temperature.

Rather than discriminating the starting timing or ending timing based on the rate of change in temperature, it is also possible to discriminate the starting timing or ending timing based on whether the temperature of the container has reached a threshold defined as a prescribed temperature. However, as illustrated in FIG. 6, the temperature of the container fluctuates little by little around the temperature of the steady state, so it is difficult to set a threshold with which the starting timing or ending timing can be discriminated.

The present invention was conceived in light of the circumstances described above, and an object of the present invention is to provide a heating control device, a heating control method, and a program for a heating control device with which the starting timing at which the solidification of a target component begins or the ending timing at which the solidification of the target component ends can be accurately discriminated.

Means for Solving the Problem

The heating control device of the present invention is a heating control device for obtaining a solid product of a target component by heating a container in which a solution containing the target component is contained with a heater and evaporating a solvent in the solution, the heating control device comprising: a temperature detection part for detecting a temperature of the container; a heating amount control part for controlling an amount of heating by the heater so that the temperature of the container approaches a target temperature based on the detection results provided by the temperature detection part; and a timing discrimination part for discriminating at least one of a starting timing at which the solidification of the target component begins and an ending timing at which the solidification of the target component ends based on the amount of heating by the heater.

With such a configuration, it is possible to accurately discriminate at least one of the starting timing and the ending timing based on the amount of heating by the heater controlled so that the temperature of the container approaches the target temperature. That is, since the amount of heating by the heater varies while being sensitively affected by the vaporization heat generated when the solvent evaporates, the starting timing at which the solidification of the target component begins or the ending timing at which the solidification of the target component ends can be accurately discriminated by using the amount of heating by the heater as a discrimination criterion.

The temperature detection part may directly or indirectly detect the temperature of the container. When the temperature detection part indirectly detects the temperature of the container, it may be configured so as to detect the temperature of a holding part for holding the temperature.

In addition, the heating amount control part may be configured to stop heating by the heater when the ending timing is discriminated by the timing discrimination part.

The timing discrimination part may be configured to discriminate at least one of the starting timing and the ending timing based on whether the amount of heating by the heater has reached a prescribed threshold.

With such a configuration, it is possible to accurately discriminate at least one of the starting timing and the ending timing using the matter of whether the amount of heating by the heater has reached a prescribed threshold as a discrimination criterion. As described above, the amount of heating by the heater varies while being sensitively affected by the vaporization heat generated when the solvent evaporates, so it is easy to discriminate whether the amount of heating by the heater has reached a prescribed threshold. Accordingly, by using the matter of whether the amount of heating by the heater has reached a prescribed threshold as a discrimination criterion, it is possible to accurately discriminate the starting timing or the ending timing in comparison to cases in which the rate of change in the temperature of the container or the temperature itself is used as a discrimination criterion.

In addition, the amount of heating by the heater ordinarily fluctuates at a higher amount of heating than the amount of heating in the steady state between the starting timing and the ending timing, so it is easy to discriminate whether the amount of heating has reached a prescribed threshold, and it is possible to more accurately discriminate the starting timing or the ending timing.

The timing discrimination part may also be configured so as to discriminate at least one of the starting timing and the ending timing based on the amount of change in the amount of heating by the heater within a prescribed amount of time.

With such a configuration, it is possible to accurately discriminate at least one of the starting timing and the ending timing using the amount of change in the amount of heating by the heater within a prescribed amount of time as a discrimination criterion. As described above, the amount of heating by the heater varies while being sensitively affected by the vaporization heat generated when the solvent evaporates, so it is easy to discriminate changes in the amount of heating by the heater. Accordingly, by using the amount of change in the amount of heating by the heater within a prescribed amount of time as a discrimination criterion, it is possible to accurately discriminate the starting timing or the ending timing in comparison to cases in which the rate of change in the temperature of the container or the temperature itself is used as a discrimination criterion.

The timing discrimination part may also be configured so as to discriminate at least one of the starting timing and the ending timing based on the slope of the change in the amount of heating by the heater within a prescribed amount of time.

In addition, the heating amount control part may be configured so as to vary the amount of heating by the heater in a stepwise manner. In this case, the timing discrimination part may be configured so as to discriminate at least one of the starting timing and the ending timing based on the number of changes in the amount of heating by the heater within a prescribed amount of time.

The timing discrimination part may also be configured so as to discriminate only the timing outside a prescribed time range as the ending timing.

With such a configuration, a timing within the prescribed time range is not discriminated as the ending timing. A certain amount of time is required from the starting timing at which the solidification of the target component begins and the ending timing at which the solidification ends, so the ending timing can be discriminated more accurately by setting a time range with a low likelihood of becoming an ending timing as the prescribed time range.

The heating control device may further have a time period determination part for determining the prescribed time period based on the amount of heating by the heater when the solvent not containing the target component is housed inside the container and the solvent is evaporated. In this case, it is possible to gain a certain grasp of a time period with a low likelihood of becoming an ending timing using a solvent not containing the target component, so the prescribed time period can be set appropriately, and the ending timing can be discriminated even more accurately.

The heating control method of the present invention is a heating control method for obtaining a solid product of a target component by heating a container in which a solution containing the target component is contained with a heater and evaporating a solvent in the solution, the heating control method comprising: a heating amount control step of controlling the amount of heating by the heater so that the temperature of the container approaches a target temperature based on the detection results provided by a temperature detection part for detecting the temperature of the container; and a timing discrimination step for discriminating at least one of the starting timing at which the solidification of the target component begins and the ending timing at which the solidification of the target component ends based on the amount of heating by the heater.

The program for a heating control device of the present invention is a program for a heating control device for obtaining a solid product of a target component by heating a container in which a solution containing the target component is contained with a heater and evaporating a solvent in the solution, wherein the program makes a computer execute the following steps: a heating amount control step of controlling the amount of heating by the heater so that the temperature of the container approaches a target temperature based on the detection results provided by a temperature detection part for detecting the temperature of the container; and a timing discrimination step for discriminating at least one of the starting timing at which the solidification of the target component begins and the ending timing at which the solidification of the target component ends based on the amount of heating by the heater.

Effect of the Invention

With the present invention, it is possible to accurately discriminate the starting timing at which the solidification of a target component begins or the ending timing at which the solidification of the target component ends based on the amount of heating by a heater controlled so that the temperature of the container approaches a target temperature.

DETAILED DESCRIPTION OF THE EXEMPLARY EMBODIMENTS

Figure 1:
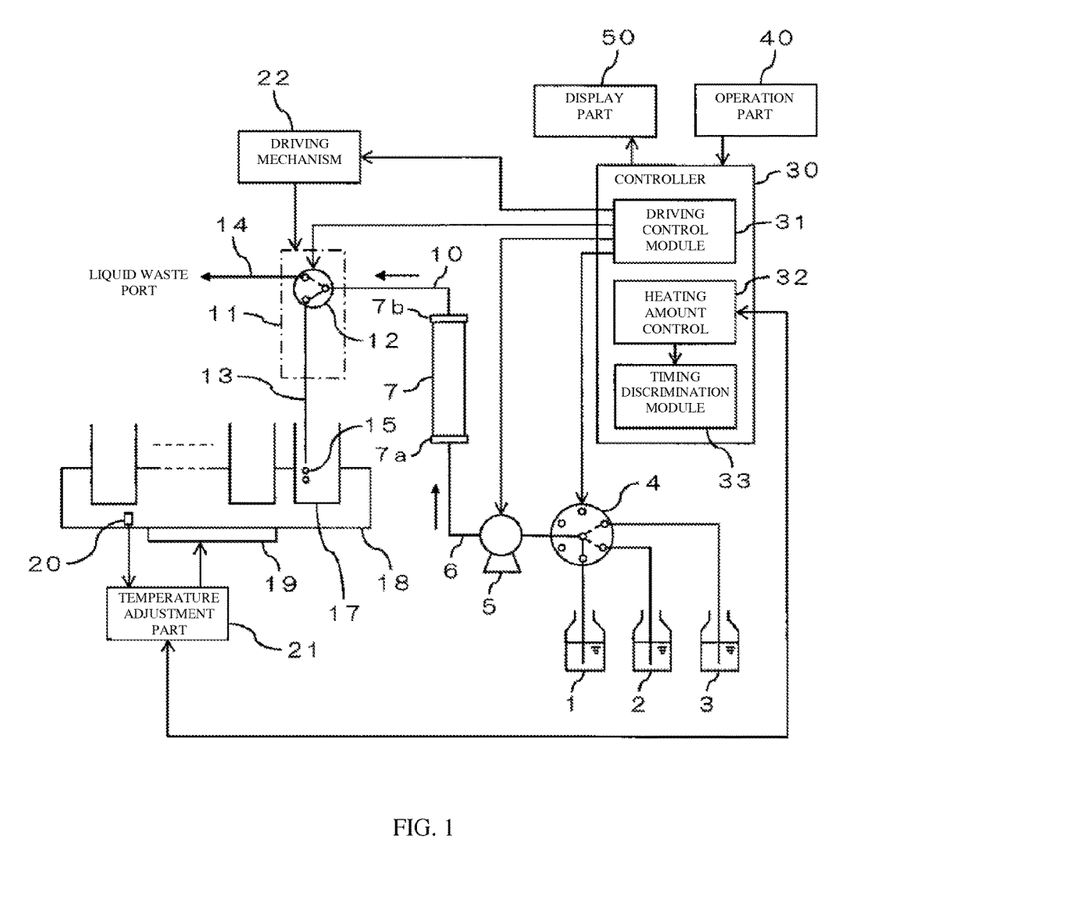
FIG. 1 is a schematic diagram illustrating an example of the configuration of a heating control device of an embodiment of the present invention.

FIG. 1 is a schematic diagram illustrating an example of the configuration of a heating control device of an embodiment of the present invention. This heating control device obtains a solid product of a target component by heating a container in which a solution containing the target component is housed with a heater and evaporating the solvent in the solution. The target component is isolated from a sample using a liquid chromatograph, for example, and an eluate 1 containing the target component is thus obtained.

In this embodiment, a heating control device for obtaining a solid product of the target component using the eluate 1 obtained in advance will be described, but the present invention is not limited to such a configuration, and a configuration in which a liquid chromatograph is connected to the heating control device and a solid product of the target component is obtained using an eluate 1 obtained by the liquid chromatograph directly, for example, may also be used.

The eluate 1 is introduced into a trap column 7 using a switching valve 4, a liquid feeding pump 5, and the like, for example. In this example, only one trap column 7 is provided, but a configuration in which a plurality of trap columns 7 are provided may also be used. The trap column 7 is provided so as to extend in the vertical direction, wherein an inlet end 7a serving as the lower end thereof is connected to the liquid feeding pump 5 via a supply flow path 6, and an outlet end 7b serving as the upper end thereof is connected to a two-way switching valve 12 via a discharge flow path 10. The two-way switching valve 12 can switch the flow path connected to the discharge flow path 10 to either a fractionation flow path 13 or a liquid waste flow path 14.

The inside of the trap column 7 is filled with an adsorbent, for example, and the target component contained in the eluate 1 introduced into the trap column 7 is captured by the adsorbent. At this time, the discharge flow path 10 is connected to the liquid waste flow path 14 by the two-way switching valve 12, and the eluate 1 containing the target compound captured by the trap column 7 is discarded to a liquid waste port via the discharge flow path 10 and the liquid waste flow path 14.

After the target component is captured by the trap column 7, the switching valve 4 is switched so that a washing liquid 2 is introduced into the trap column 7. The washing liquid 2 consists of purified water, for example. Salts or the like adhering to the adsorbent inside the trap column 7 at the time of the capture of the target component are discharged from within the trap column 7 by the washing liquid 2 and discarded to the liquid waste port via the discharge flow path 10 and the liquid waste flow path 14. At this time, most of the target component captured by the adsorbent is not eluted in the washing liquid 2 due to the strong adsorption action of the adsorbent, so the state in which the target component is captured by the adsorbent is maintained.

The switching valve 4 is then switched again so that a solvent 3 is introduced into the trap column 7. Dichloromethane, for example, can be used as the solvent 3, but the present invention is not limited to this. The solvent 3 consists, for example, of a component that has a larger specific gravity than the washing liquid 2 and is compatible with the washing liquid 2. By slowly introducing such a solvent 3 into the trap column 7, the washing liquid 2 can be pushed up by the solvent 3 with a large specific gravity. The washing liquid 2 that is pushed up by the solvent 3 is discharged from within the trap column 7 and is discarded to the liquid waste port via the discharge flow path 10 and the liquid waste flow path 14.

In this way, the solvent 3 gradually accumulates inside the trap column 7, and the target component captured by the adsorbent is eluted in the solvent 3 so that the solution 15 containing the target component is fractionated. The two-way switching valve 12 is then switched and the discharge flow path 10 is connected to the fractionation flow path 13 so that the solution 15 containing the target component is collected inside the container 17 via the discharge flow path 10 and the fractionation flow path 13.

In this embodiment, a plurality of containers 17 are held by a holding part 18 provided with a heater 19 and a temperature detection part 20. The two-way switching valve 12 and the fractionation flow path 13 are held by a movable fractionation head 11, and the fractionation head 11 is moved by a driving mechanism 22 so that the solution 15 containing the target component can be collected inside each container 17. However, the present invention is not limited to a configuration in which the fractionation head 11 is moved by the driving mechanism 22, and a configuration in which the holding part 18 is moved or a configuration in which the driving mechanism 22 is omitted, for example, may also be used.

The holding part 18 is formed from a material with high thermal conductivity such as aluminum, for example, and the outside is preferably coated with an insulating material in order to prevent heat from escaping to the periphery thereof. In addition, at least the base of each container 17 preferably makes contact with the holding part 18 so that heat can be easily transmitted to each container 17, and it is even more preferable for the side surface of each container 17 to make contact with the holding part 18.

The holding part 18 is heated by the heater 19, and each container 17 is indirectly heated via the holding part 18. The temperature detection part 20 consists of a thermistor or the like, for example, and the temperature of each container 17 can be detected indirectly by detecting the temperature of the holding part 18 with the temperature detection part 20. The containers 17 for housing the solution 15 containing the target component are not necessarily a plurality of containers and may also be a single container. In addition, the heater 19 may heat the containers 17 indirectly, and the temperature detection part 20 may detect the temperature of the containers 17 directly.

The heater 19 and the temperature detection part 20 are electrically connected to a temperature adjustment part 21. A detection signal from the temperature detection part 20 is inputted into the temperature adjustment part 21, and the temperature adjustment part 21 varies the power supplied to the heater 19 based on a control signal inputted from a controller 30 in response to the detection signal so that the amount of heating by the heater 19 is controlled.

The controller 30 has a configuration including a CPU (Central Processing Unit), for example, and the CPU executes programs so as to function as a driving control part 31, a heating amount control part 32, a timing discrimination part 33, and the like. An operation part 40 is connected to the controller 30, and a user can operate the operation part 40 so as to input an instruction signal related to the operation of the heating control device into the control part 30. In addition, a display part 50 is connected to the controller 30, and the user can confirm the operating state or the like of the heating control device based on the content displayed on the display part 50.

The driving control module 31 outputs driving signals to the switching valve 4, the liquid feeding pump 5, the two-way switching valve 12, the driving mechanism 22, and the like so as to control the operation of each of these parts. The heating amount control part 32 controls the amount of heating by the heater 19 based on the detection results provided by the temperature detection part 20 so that the temperature of the containers 17 approaches a target temperature. The target temperature is preferably a temperature that is approximately the same as or slightly higher than the boiling point of the solvent 3. For example, when the solvent 3 is dichloromethane, the target temperature is preferably approximately 40 to 45° C. The target temperature may be a constant value, or a configuration in which the value varies, for example, may also be used.

The solution 15 containing the target component fractionated from the trap column 7 via the discharge flow path 10 and the fractionation flow path 13 is housed inside the containers 17 heated by the heater 19 as described above. As a result, the solvent 3 in the solution 15 evaporates, which makes it possible to obtain a solid product (for example, a powder) of the target component.

A configuration in which the solution containing the target component obtained by fractionation is simply dropped into the containers 17 may be used, or a configuration in which a gas flow such as nitrogen gas is generated in the vicinity of the outlet of the fractionation flow path 13 so that the dropped solution 15 is scattered in the form of fine liquid droplets, for example, may also be employed. In addition, the present invention is not limited to a configuration in which the solution 15 is housed inside the containers 17 which are heated by the heater 19, and a configuration in which heating by the heater 19 is started after the solution 15 is housed inside the containers 17 may also be used.

The timing discrimination part 33 discriminates the starting timing at which the solidification of the target component begins and the ending timing at which the solidification of the target component ends based on the amount of heating by the heater 19. However, the timing discrimination part 33 is not limited to a configuration in which both the starting timing and the ending timing are discriminated, and a configuration in which only one of the starting timing or the ending timing is discriminated may also be used.

In this embodiment, a configuration in which a solid product of the target component is obtained by heating the solution 15 containing the target component obtained by fractionation is described, but the present invention is not limited to such a configuration, and a configuration in which a solid product of the target component is obtained by heating the solution 15 containing the target component obtained by a method other than fractionation may also be used.

Figure 2:
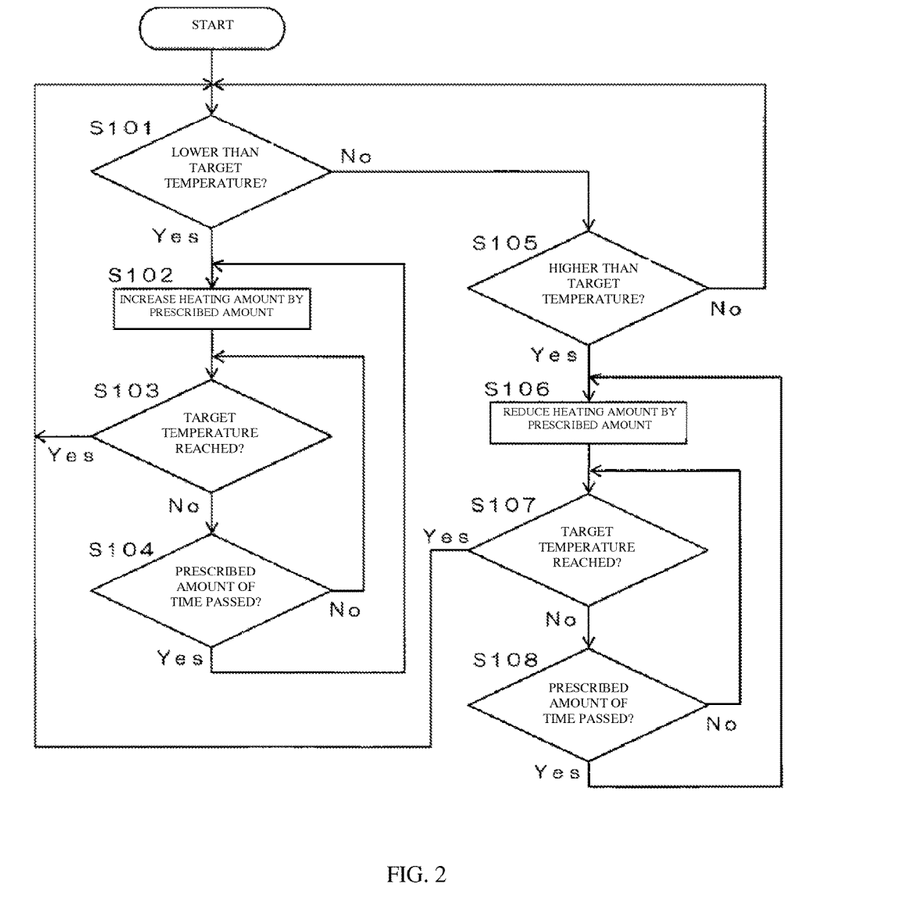
FIG. 2 is a flowchart illustrating an example of the processing performed by the heating amount control part.

FIG. 2 is a flowchart illustrating an example of the processing performed by the heating amount control part 32. The processing illustrated in FIG. 2 is only an example, and the amount of heating by the heater 19 can be controlled using any other method such as PID control, for example.

The heating amount control part 32 in this embodiment monitors whether the temperature of the containers 17 is lower than the target temperature (step S101) and whether the temperature of the containers 17 is higher than the target temperature (step S105) based on the detection results provided by the temperature detection part 20. When the temperature of the containers 17 is the target temperature (No in step S101 and No in step S105), the amount of heating by the heater 19 is kept constant.

If the temperature of the containers 17 is lower than the target temperature (Yes in step S101), processing is performed to increase the amount of heating by the heater 19 by a prescribed amount (step S102). As a result, the temperature of the containers 17 increases gradually. At this time, the heating amount control part 32 monitors whether the temperature of the containers 17 reaches the target temperature before a prescribed amount of time has elapsed based on the detection results provided by the temperature detection part 20 (steps S103 and S104).

If the temperature of the containers 17 has reached the target temperature before a prescribed amount of time has passed (Yes in step S103), the amount of heating by the heater 19 is not increased further, and it is once again monitored whether the temperature of the containers 17 is still the target temperature (step S101 and step S105). On the other hand, if the temperature of the containers 17 has not reached the target temperature even after a prescribed amount of time has passed (Yes in step S104), the amount of heating by the heater 19 is once again increased by a prescribed amount (step S102), and it is monitored whether the temperature of the containers 17 reaches the target temperature before a prescribed amount of time has passed (steps S103 and S104).

In this way, if the temperature of the containers 17 is lower than the target temperature (Yes in step S101), the heating amount control part 32 controls the temperature of the containers 17 so as to approach the target temperature by increasing the amount of heating by the heater 19 in a stepwise manner.

If the temperature of the containers 17 is higher than the target temperature (Yes in step S105), processing is performed to reduce the amount of heating by the heater 19 by a prescribed amount (step S106). As a result, the temperature of the containers 17 decreases gradually. At this time, the heating amount control part 32 monitors whether the temperature of the containers 17 reaches the target temperature before a prescribed amount of time has elapsed based on the detection results provided by the temperature detection part 20 (steps S107 and S108).

If the temperature of the containers 17 has reached the target temperature before a prescribed amount of time has passed (Yes in step S107), the amount of heating by the heater 19 is not reduced further, and it is once again monitored whether the temperature of the containers 17 is still the target temperature (step S101 and step S105). On the other hand, if the temperature of the containers 17 has not reached the target temperature even after a prescribed amount of time has passed (Yes in step S108), the amount of heating by the heater 19 is once again reduced by a prescribed amount (step S106), and it is monitored whether the temperature of the containers 17 reaches the target temperature before a prescribed amount of time has passed (steps S107 and S108).

In this way, if the temperature of the containers 17 is higher than the target temperature (Yes in step S105), the heating amount control part 32 controls the temperature of the containers 17 so as to approach the target temperature by reducing the amount of heating by the heater 19 in a stepwise manner.

Figure 3:
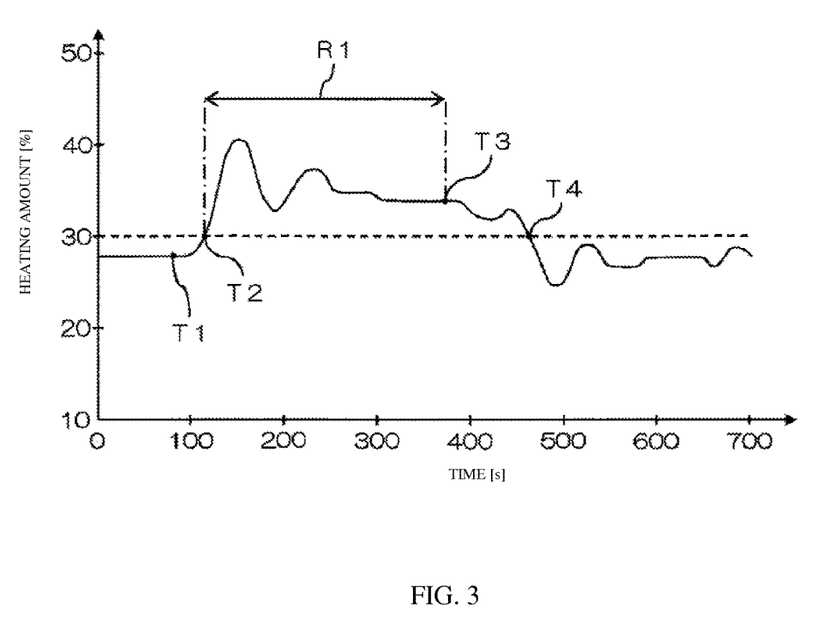
FIG. 3 illustrates an example of changes in the amount of heating when a solution containing a target component is heated by a heater.

FIG. 3 illustrates an example of changes in the amount of heating when a solution 15 containing a target component is heated by the heater 19. In this example, 3 ml of a solution 15 containing caffeine as the target component and containing dichloromethane as a solvent 3 is collected in the containers 17, and changes in the amount of heating when heated by the heater 19 are monitored. The amount of heating by the heater 19 is expressed as the percentage (%) of power actually supplied to the heater 19 using the maximum value of power that can be supplied from the temperature adjustment part 21 to the heater 19 as a reference. That is, the amount of heating by the heater 19 can be expressed as a value that is proportional to the amount of power supplied to the heater 19, for example.

As illustrated in FIG. 3, prior to timing T1 at which the feeding of the solvent 3 into the trap column 7 is begun, no vaporization heat is generated, so there is practically no change in the temperature of the containers 17 from the target temperature, and the amount of heating by the heater 19 is kept roughly constant at 28 to 29%. In this steady state, the feeding of the solvent 3 into the trap column 7 is begun at a point (timing T1) 80 seconds after measurements are begun.

In step with the starting of the feeding of the solvent 3, the target component captured inside the trap column 7 is eluted into the solvent 3, and the solution 15 containing the target component 15 is sent to the containers 17. When the solution 15 containing the target component 15 reaches the inside of the containers 17, the solvent 3 in the solution 15 begins to evaporate. At this time, the heat of the containers is taken by the vaporization heat, and the temperature of the containers 17 falls below the target temperature. Therefore, the heating amount control part 32 increases the amount of heating by the heater 19 so that the temperature of the containers 17 approaches the target temperature.

In the example of FIG. 3, the amount of heating by the heater 19 increased rapidly in approximately 100 seconds from when measurements were begun, and the amount of heating by the heater 19 exceeded 30% at a point (timing T2) 110 seconds after measurements were begun. At this time, it was confirmed visually that the solution 15 containing the target component 15 began to accumulate in the containers 17.

The amount of heating by the heater 19 then transitioned within a range of approximately 33 to 41% until the feeding of the solvent 3 was stopped at a point (timing T3) 370 seconds after measurements were begun. Even after the point (timing T3) at which the feeding of the solvent 3 was stopped, the solvent 3 in the solution 15 accumulated in the containers 17 evaporated, but the amount of heating by the heater 19 began to decrease in step with a decrease in vaporization heat, and the amount of heating by the heater 19 fell below 30% at a point (timing T4) 460 seconds after measurements were begun.

At this time, the solvent 3 in the solution 15 inside the containers 17 was completely evaporated, and it was confirmed that a powder of the target component, caffeine, was obtained. In this way, when the solvent 3 in the solution 15 is completely evaporated, the heat of the containers 17 is no longer taken by the vaporization heat, so the amount of heating by the heater 19 rapidly decreases, as illustrated in FIG. 3.

Based on such measurement results, the point (timing T2) 110 seconds after measurements are begun can be discriminated as the starting timing at which the solidification of the target component begins, and the point (timing T4) 460 seconds after measurements are begun can be discriminated as the ending timing at which the solidification of the target component ends. The present invention may configured so that at least one of the starting timing and the ending timing that are discriminated in this way is displayed on the display part 50 as the operating state of the heating control device. In this case, at least one of the starting timing and the ending timing may be displayed on the display part 50 together with the changes in the amount of heating by the heater 19 such as those illustrated in FIG. 3.

Figure 4:
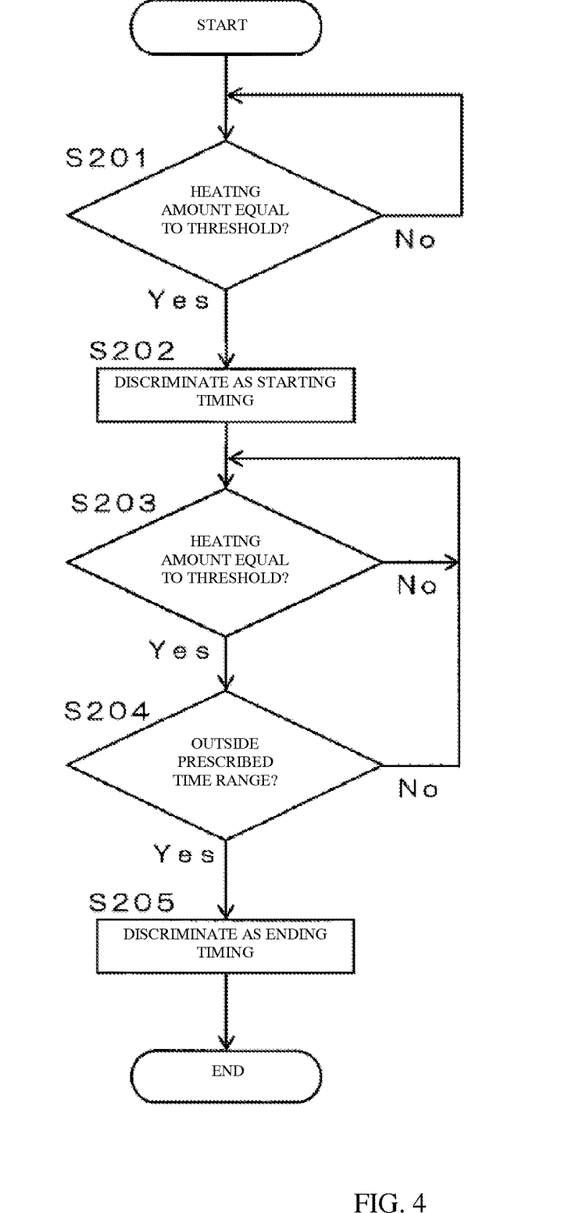
FIG. 4 is a flowchart illustrating an example of the processing performed by the timing discrimination part.

FIG. 4 is a flowchart illustrating an example of the processing performed by the timing discrimination part 33. In this embodiment, the heating amount control part 32 discriminates the starting timing T2 and the ending timing T4 based on whether the amount of heating by the heater 19 has reached a prescribed threshold. The threshold is preferably an amount of heating that is higher than the amount of heating in the steady state, and in the example of FIG. 3, the threshold is set to 30%, for example.

The threshold may be stored in advance in a storage part, for example, or may be set by the operation of the operation part 40. In addition, the threshold may be set to a different value depending on the type of the solvent 3. In this case, for example, when the volatility of the solvent 3 is high, the threshold is preferably set to a relatively high value, and when the volatility of the solvent 3 is low, the threshold is preferably set to a relatively low value.

After the feeding of the solvent 3 into the trap column 7 is begun, the timing discrimination module 33 monitors whether the amount of heating by the heater 19 has reached the threshold (step S201). If the amount of heating by the heater 19 has reached the threshold (Yes in step S201), the timing is discriminated as the starting timing T2 (step S202). The timing discrimination module 33 then once again monitors whether the amount of heating by the heater 19 has reached the threshold (step S203).

Even after the starting timing T2, the amount of heating by the heater 19 ordinarily fluctuates at a higher amount of heating than the amount of heating in the steady state, and when the feeding of the solvent 3 is stopped, the amount of heating by the heater 19 begins to decrease. Therefore, if the amount of heating by the heater 19 has reached the threshold after a prescribed time range R1 has passed after the starting timing T2 (Yes in step S203 and Yes in step S204), this timing is discriminated as the ending timing T4 (step S205). At this time, the heating amount control module 32 may be configured so as to stop heating with the heater 19.

In this embodiment, the starting timing T2 and the ending timing T4 can be accurately discriminated based on the amount of heating by the heater 19 controlled so that the temperature of the containers 17 approaches the target temperature. That is, as illustrated in FIG. 3, the amount of heating by the heater 19 varies while being sensitively affected by the vaporization heat generated when the solvent evaporates 3, so the starting timing T2 at which the solidification of the target component begins and the ending timing T4 at which the solidification of the target component ends can be accurately discriminated by using the amount of heating by the heater 19 as a discrimination criterion.

In particular, in this embodiment, the starting timing T2 and the ending timing T4 can be accurately discriminated using the matter of whether the amount of heating by the heater 19 has reached a prescribed threshold as a discrimination criterion. As described above, the amount of heating by the heater 19 varies while being sensitively affected by the vaporization heat generated when the solvent evaporates 3, so it is easy to discriminate whether the amount of heating by the heater 19 has reached the prescribed threshold. Accordingly, by using the matter of whether the amount of heating by the heater 19 has reached the prescribed threshold as a discrimination criterion, it is possible to accurately discriminate the starting timing T2 and the ending timing T4 in comparison to cases in which the rate of change in the temperature of the containers 17 or the temperature itself is used as a discrimination criterion.

In addition, as illustrated in FIG. 3, the amount of heating by the heater 19 ordinarily fluctuates at a higher amount of heating than the amount of heating in the steady state between the starting timing T2 and the ending timing T4, so it is easy to discriminate whether the amount of heating has reached a prescribed threshold, and it is possible to accurately discriminate the starting timing T2 and the ending timing T4.

On the other hand, even if the amount of heating by the heater 19 has reached the threshold (Yes in step S203), when the timing thereof is within the prescribed time range R1 from the starting timing T2 (No in step S204), the timing is not discriminated as the ending timing T4, and it is once again monitored whether the amount of heating by the heater 19 has reached the threshold (step S203).

In this way, in this embodiment, only a timing outside the prescribed time range R1 is discriminated as the ending timing T4, and a timing within the prescribed time range R1 is not discriminated as the ending timing T4. A certain amount of time is required from the starting timing T2 at which the solidification of the target component begins until the ending timing T4 at which the solidification ends, so the ending timing T4 can be more accurately discriminated by setting a time range with a low likelihood of becoming the ending timing T4 as the prescribed time range R1.

For example, immediately after the starting timing T2, the amount of heating by the heater 19 is not stable, so there is a possibility that the amount of heating by the heater 19 may fall below the threshold due to a phenomenon such as so-called overshoot or hunting. Even in such cases, by using a configuration in which a timing within the prescribed time range R1 is not discriminated as the ending timing T4, it is possible to prevent the mistaken discrimination of the ending timing T4.

As illustrated in FIG. 3, for example, the prescribed time range R1 may be a time range from the starting timing T2 until a timing T3 at which the feeding of the solvent 3 is stopped. However, the prescribed time range R1 is not limited to such a time range and may also be set, for example, to any other time range such as a time range using a timing other than the starting timing T2 as a reference.

For example, it is also possible to employ a configuration in which a solvent 3 not containing the target component is housed in the containers 17 and the prescribed time range R1 is determined based on the amount of heating by the heater 19 when the solvent 3 is evaporated. In this case, it is possible to gain a certain grasp of a time period with a low likelihood of becoming the ending timing T4 using a solvent 3 not containing the target component, so the prescribed time period R1 can be set appropriately, and the ending timing T4 can be discriminated even more accurately.

In this embodiment, a case in which the threshold of the amount of heating by the heater 19 is the same for the starting timing T2 and the ending timing T4 was described, but the present invention is not limited to such a configuration, and a configuration in which the threshold of the amount of heating by the heater 19 differs for the starting timing T2 and the ending timing T4 may also be used.

In addition, the timing discrimination module 33 is not limited to a configuration in which both the starting timing T2 and the ending timing T4 are discriminated based on whether the amount of heating by the heater 19 has reached the prescribed threshold, and a configuration in which only one of the timings of the starting timing T2 or the ending timing T4 is discriminated with such a method may also be used. In this case, the timing discrimination module 33 may be configured so as to not discriminate the other timing or, in another aspect, may be configured so as to discriminate the other timing.

Figure 5:
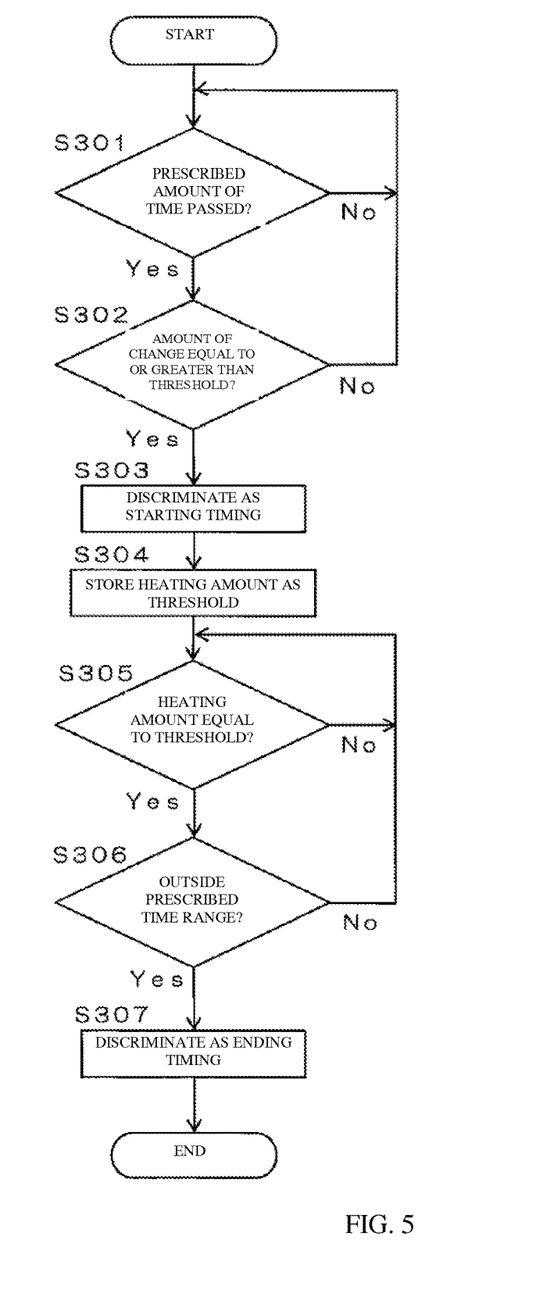
FIG. 5 is a flowchart illustrating an example of the processing performed by the timing discrimination part in another embodiment.

FIG. 5 is a flowchart illustrating an example of the processing performed by the timing discrimination module 33 in another embodiment. In this embodiment, the timing discrimination module 33 discriminates the starting timing T2 based on the amount of change in the amount of heating by the heater 19 within a prescribed amount of time. On the other hand, as in the case of the embodiment described above, the ending timing T4 is discriminated based on whether the amount of heating by the heater 19 has reached the prescribed threshold.

The amount of change within a prescribed amount of time may be, for example, the slope of changes in the amount of heating by the heater 19 within a prescribed amount of time or the number of changes in the amount of heating by the heater 19, which varies in a stepwise manner, within a prescribed amount of time. The slope of changes in the amount of heating by the heater 19 within a prescribed amount of time can be obtained by dividing the difference in the amounts of heating at the beginning and the end of the prescribed amount of time by the prescribed amount of time, for example. The number of changes in the amount of heating by the heater 19, which varies in a stepwise manner, within a prescribed amount of time can be obtained by counting the number of times that the amount of heating by the heater 19 changes in a stepwise manner in the prescribed amount of time, for example.

In this embodiment, after the feeding of the solvent 3 into the trap column 7 is begun, the timing discrimination module 33 determines, each time a prescribed amount of time has passed (step S301), whether the amount of change in the amount of heating by the heater 19 within the prescribed amount of time is equal to or greater than a threshold (step S302). If the amount of change in the amount of heating by the heater 19 is equal to or greater than the threshold (Yes in step S302), the timing is discriminated as the starting timing T2 (step S303). At this time, the amount of heating by the heater 19 at the starting timing T2 is stored in the storage module as a threshold. However, the present invention is not limited to such a configuration, and the threshold of the amount of heating may also be stored in advance in the storage part.

The timing discrimination module 33 then monitors whether the amount of heating by the heater 19 has reached the threshold (step S305). If the amount of heating by the heater 19 has reached the threshold after a prescribed time range R1 has passed from the starting timing T2, (Yes in step S305 and Yes in step S306), the timing is discriminated as the ending timing T4 (step S307). At this time, the heating amount control module 32 may be configured so as to stop heating with the heater 19.

On the other hand, even if the amount of heating by the heater 19 has reached the threshold (Yes in step S305), when the timing is within the prescribed time range R1 after the starting timing T2 (No in step S306), the timing is not discriminated as the ending timing T4, and it is once again monitored whether the amount of heating by the heater 19 has reached the threshold (step S305).

In this embodiment, the starting timing T2 can be accurately discriminated using the amount of change in the amount of heating by the heater 19 within a prescribed amount of time as a discrimination criterion. As described above, the amount of heating by the heater 19 varies while being sensitively affected by the vaporization heat generated when the solvent evaporates 3, so it is easy to discriminate whether the amount of heating by the heater 19 has reached the prescribed threshold. Accordingly, by using the change in the amount of heating by the heater 19 as a discrimination criterion, it is possible to accurately discriminate the starting timing T2 in comparison to cases in which the rate of change in the temperature of the containers 17 or the temperature itself is used as a discrimination criterion.

However, a configuration in which the ending timing T4 is also discriminated based on the amount of change in the amount of heating by the heater 19 within a prescribed amount of time may also be used. In this case, a configuration may be used in which even if the amount of change in the amount of heating by the heater 19 is equal to or greater than the threshold after the starting timing T2 has been discriminated, the timing is not discriminated as the ending timing T4 when the timing is within the prescribed time range R1 after the starting timing T2.

In the embodiments described above, a configuration was described in which both the heating amount control step of controlling the amount of heating by the heater 19 based on the detection results provided by the temperature detection part 20 and the timing discrimination step of discriminating at least one of the starting timing T2 and the ending timing T4 based on the amount of heating by the heater 19 are executed by the heating control device. In this case, a program for making a computer execute each step may be provided separately from the heating control device. As a result, the computer which administers control using the program functions as a heating control device, which makes it possible to yield the same effects as those of the embodiments described above. In addition, the program may also be provided in a state in which it is stored on a recording medium.

In addition, in the embodiments described above, a configuration was described in which the amount of heating by the heater 19 is monitored so as to discriminate at least one of the starting timing T2 and the ending timing T4 in real time. However, the present invention is not limited to such a configuration and may also use a configuration in which, for example, after changes in the amount of heating by the heater 19 are measured, at least one of the starting timing T2 and the ending timing T4 is discriminated based on the pattern of the changes in the amount of heating by the heater 19 such as those illustrated in FIG. 3.

EXPLANATION OF SYMBOLS 1 eluate
2 washing liquid
3 solvent
4 switching valve
5 liquid feeding pump
6 supply flow path
7 trap column
10 discharge flow path
11 fractionation head
12 two-way switching valve
13 fractionation flow path
14 liquid waste flow path
15 solution
17 container
18 holding part
19 heater
20 temperature detection part
21 temperature adjustment part
22 driving mechanism
30 controller
31 driving control module
32 heating amount control module
33 timing discrimination module
40 operation part
50 display part
T2 starting timing
T4 ending timing
R1 time range

What is claimed:

1. A heating control device for obtaining a solid product of a target component by heating a container in which a solution containing the target component is contained with a heater and evaporating a solvent in the solution, the heating control device comprising:
   a controller including
      a temperature detection module for detecting a temperature of the container;
      a heating amount module for controlling an amount of heating by the heater so that the temperature of the container approaches a target temperature based on the detection results provided by the temperature detection module; and
      a timing discrimination module for discriminating at least one of a starting timing at which the solidification of the target component begins and an ending timing at which the solidification of the target component ends based on the amount of heating by the heater.

2. The heating control device according to claim 1, wherein the timing discrimination module discriminates at least one of the starting timing and the ending timing based on whether the amount of heating by the heater has reached a prescribed threshold.

3. The heating control device according to claim 1, wherein the timing discrimination module discriminates at least one of the starting timing and the ending timing based on an amount of change in the amount of heating by the heater within a prescribed amount of time.

4. The heating control device according to claim 1, wherein the timing discrimination module discriminates only a timing outside a prescribed time range as the ending timing.

5. A heating control method for obtaining a solid product of a target component by heating a container in which a solution containing the target component is contained with a heater and evaporating a solvent in the solution, the heating control method comprising:
   controlling the amount of heating by the heater so that the temperature of the container approaches a target temperature based on the detection results provided by a temperature detection module for detecting the temperature of the container; and
   discriminating at least one of the starting timing at which the solidification of the target component begins and the ending timing at which the solidification of the target component ends based on the amount of heating by the heater.

* * * * *